Patented Nov. 19, 1929

1,736,294

UNITED STATES PATENT OFFICE

FREDERICK M. VENZIE, OF PHILADELPHIA, PENNSYLVANIA

PLASTER COMPOSITION

No Drawing.   Application filed June 16, 1923. Serial No. 645,717.

This invention generally stated relates to partition, wall, ceiling and like construction and specifically relates to a plaster composition therefor.

The objects of the present invention will be apparent from the following description.

A description will first be given of my improved plaster and plaster-block composition. I take about one part of plaster-of-Paris, about one quarter part of asbestos powder and either powdered cork, fine sawdust or finely cut sponge in the proportion of about one-half part and mix together in a dry state and then add thereto and mix therewith about three-quarters part of water. If a binder is required I add a small quantity of liquid or powdered glue. If desired I add about 5% of silicate of soda or a similar amount of dextrine for hardening purposes. The above composition may be used as a plaster or be formed into plaster-blocks. It is termed rough coating and I surface same with a finishing coating made as follows:—I take about one part of plaster-of-Paris, about one-quarter part of asbestos powder and mix therewith about three-quarters part of water to which mixture I add a retarder, that is, an ingredient to prevent quick setting. I may use Epsom-salts, boric-acid, powdered-soap or other retarder in the proportion of about ¼ of 1%. Both the rough and finishing material is efficient and relatively cheap and when formed into socalled plaster-blocks form a light structure possessed of sound-proofing, moisture proofing and fire-proofing characteristics, and also prevents check-cracking

What I claim is:

A plaster composition for building purposes comprising about one part of plaster-of-Paris, about one quarter part of asbestos powder; about one-half-part of sawdust; and a sufficient quantity of water to procure a mixture.

In testimony whereof, I have hereunto signed my name.

FREDERICK M. VENZIE.